Patented Dec. 16, 1924.

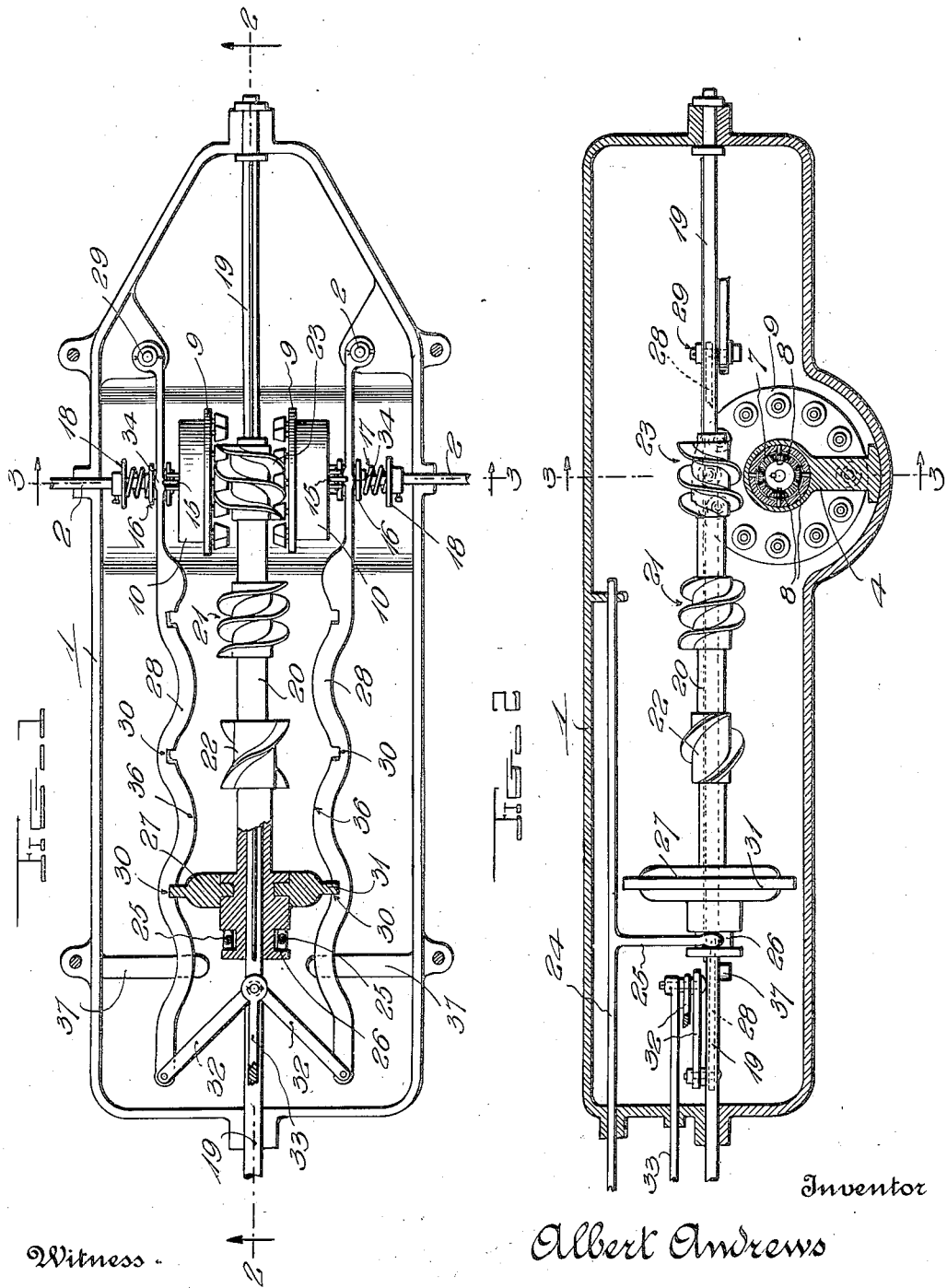

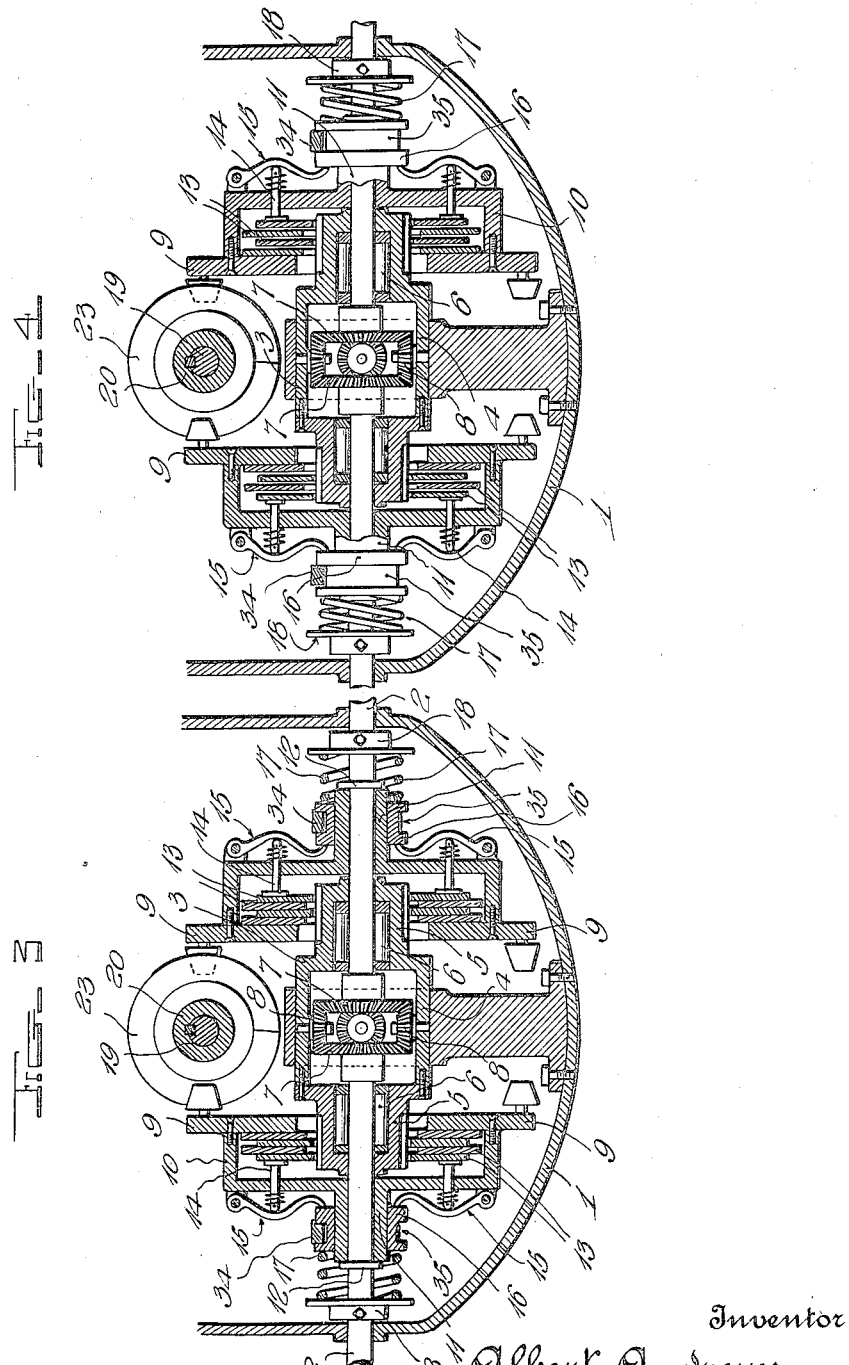

1,519,895

UNITED STATES PATENT OFFICE.

ALBERT ANDREWS, OF SHERIDAN, WYOMING.

TRANSMISSION MECHANISM.

Application filed March 27, 1924. Serial No. 702,462.

*To all whom it may concern:*

Be it known that I, ALBERT ANDREWS, a citizen of the United States, residing at Sheridan, in the county of Sheridan and State of Wyoming, have invented certain new and useful Improvements in Transmission Mechanisms; and I do declare the following to be a full, clear, and exact description of the invention, such as will enable others skilled in the art to which it appertains to make and use the same.

This invention relates to improvements in transmission mechanisms of the type shown in U. S. Patent No. 1,479,167 of January 1st, 1924, in which a plurality of axially shiftable and axially alined worms are selectively engageable with a pair of gears on two shaft or axle sections.

One object of the invention is to incorporate a differential mechanism with the axle sections and the two gears.

Another aim is to provide clutches for freeing the two gears when one worm is to be shifted out of mesh therewith and another shifted into mesh, said clutches permitting free turning of said gears with respect to their respective shafts, during the shifting operations.

Yet another object is to provide unique means for holding a sleeve which carries the several worms, in any position to which it is adjusted.

A still further aim is to provide means for simultaneously releasing the holding means for the sleeve and releasing the above-named clutches.

With the foregoing in view, the invention resides in the novel subject matter hereinafter described and claimed, the description being supplemented by the accompanying drawings, wherein:

Figure 1 is a plan view of the invention partly in horizontal section.

Figure 2 is substantially a central longitudinal sectional view as indicated by line 2—2 of Fig. 1.

Figure 3 is a vertical transverse sectional view on line 3—3 of Figs. 1 and 2.

Figure 4 is a view similar to Fig. 3, but illustrating the clutches disengaged.

In the drawings above briefly described, the numeral 1 designates a transmission and differential housing which may be of any desired construction. Into the rear end of this housing, a pair of transverse, axially alined shaft or axle sections 2 extend, through suitable bearings, the inner ends of said shaft or axle sections passing into a differential shell 3 which is in the present showing, rotatably mounted in a suitable bearing 4 secured to the casing 1. The shell 3 is preferably provided with hollow hubs 5 at its ends, concentric with the shaft or axle sections 2 and containing appropriate bearings 6 therefor. Within the shell 3, the shaft or axle sections 2 are provided with bevel gears 7 meshing with similar gears 8 rotatably carried by said shell, so that turning of this shell will drive both shaft or axle sections, yet differential movement of these sections will be permitted.

Surrounding the hubs 5, a pair of crown gears 9 have been shown, and clutches are provided for connecting these gears with said hubs. In the present showing, the outer side of each gear 9 is provided with a clutch housing 10 having a hub 11, and the two shaft or axle sections 2 pass rotatably through these hubs. The gears 9 are preferably held against spreading by suitable stop collars 12 on the shaft or axle sections 2, abutting the outer ends of the hubs 11.

Within the clutch casings 10, co-acting clutch disks 13 have been shown, connected alternately with said casings and the hubs 5. Pins 14 have been shown extending outwardly from the disks 13, through openings in the casings 10 and contacting with clutch levers 15 which are fulcrumed at the exteriors of the casings 10, the inner ends of these levers being operatively associated with sliding collars 16 on the hubs 11. Against these collars, coiled compression springs 17 act inwardly to normally hold the clutch disks in operative relation with each other, said springs re-acting against appropriate collars 18 on the shaft or axle sections 2. When the collars 16 are moved outwardly, the clutch disks 13 are freed of frictional engagement with each other and consequently the gears 9 may turn with respect to the shell 3 and the shaft or axle sections 2.

A longitudinal drive shaft 19 passes through the casing 1, preferably above the shell 3, and upon this shaft, a sleeve or shaft member 20 is splined, said sleeve carrying a plurality of worms to mesh with the crown gears 9. Preferably, the sleeve 20 is provided with a low speed worm 21, a high speed worm 22 and a reverse worm 23. A shifting rod 24 has been shown for sliding the sleeve 20 to any desired position along the shaft 19, said rod 24 having a forked arm 25 whose furcations are received in a groove 26 in one end of the sleeve. It will be obvious that in place of this particular running connection between the sleeve and its operating rod, any other desired connection could be employed.

To hold the sleeve 20 to any position to which it is moved, I provide novel means, here shown as including a collar 27 swiveled upon said sleeve, and a pair of longitudinal levers 28 in the casing 1, suitably fulcrumed at one end as indicated at 29. These levers are preferably provided in their inner edges, with notches 30 at spaced points and the collar 27 has been shown with a flange 31 receivable in these notches. As long as this flange is in two opposed notches of the levers 28, the sleeve 20 cannot slide, but when the levers are spread to free the flange 30, the rod 24 may be operated to slide said sleeve, and provision is made (described below) for automatically throwing the crown gear clutches (above described) out, when said levers 28 are spread in the manner set forth.

For spreading the levers 28, any suitable means, such as the toggle links 32 and operating rod 33, may be employed.

In the construction shown, the levers 28 are provided with portions 34 extending across the clutch collars 16 and received in grooves 35 with which said collars are formed. It will thus be seen that when the rod 33 is pulled, the links 32 will spread the levers 28 to free the collar 27 of the sleeve 20, and at the same time, said levers 28 will shift the clutch collars 16 outwardly, against the action of the springs 17, thus freeing the clutches. Then, the rod 24 may be operated to slide the sleeve 20 to bring any one of the worms into mesh with the crown gears 20, and as these gears are then free of connection with the differential shell 3 and the shaft or axle sections 2, they may turn freely as one worm moves out of mesh with them and another is forced into mesh. When the levers 28 return to their initial positions, certain of their notches 30 will again engage the flange 31 and hold the sleeve 20 in the position at which it has been set.

Between the notches 30, the two levers 28 are preferably provided with inwardly extending cams 36 which co-operate with the flange 31 as the sleeve is being shifted, for the purpose of holding said levers spread, and thus holding the clutches out of play. By making this provision, it is only necessary to initially operate the rod 33 to spread the levers 28 until shifting of the sleeve 20 has started. Then, the rod 33 may be released and the levers will be held spread by the collar 27 and cams 36, until the proper time, at which time, the flange 31 will snap into the next pair of notches 30.

Any preferred means may be provided for supporting and guiding the free ends of the levers 28. For this purpose, I have illustrated vertically spaced guide arms 37 extending inwardly from the sides of the casing 1 and respectively overlying and underlying said levers.

It will be seen from the foregoing, that a very efficient and desirable transmission has been provided, which may be readily shifted from one speed to another or to reverse, and will be effectively held in the condition at which it is set. Attention is also invited to the fact that provision has been made for permitting differential movement of the shaft or axle sections 2, so that the transmission mechanism is well adapted for use upon motor trucks and the like.

Excellent results may be obtained from the general association of parts herein disclosed, but the details of construction herein illustrated may be varied in a great number of ways, within the scope of the invention as claimed.

I claim:

1. A transmission mechanism comprising a pair of axially alined shaft sections, spaced gears carried by the inner ends of said sections, means for connecting said gears with said shaft sections, including a pair of clutches for freeing said gears to turn with respect to said shaft sections, a plurality of axially alined and axially shiftable worms adapted to be selectively meshed with said gears, means for throwing said clutches out of play, and means for shifting said worms and holding them in adjusted positions.

2. A transmission mechanism comprising a pair of axially alined shaft sections, gears at the inner ends of said sections, means for connecting said gears and sections including clutches for freeing said gears to permit free turning thereof with respect to the shaft sections, a shaft member transverse to said gears, said shaft member being mounted for rotation and axial sliding, a plurality of worms carried by said shaft member and adapted for mesh selectively with said gears, means for sliding said shaft member, and combined means for holding said shaft member in adjusted position and for controlling the aforesaid clutches.

3. A transmission mechanism comprising a pair of axially alined shaft sections, gears at the inner ends of said sections, means for connecting said gears with said sections, including clutches for freeing said gears and permitting turning thereof with respect to said sections, a rotatable and slidable shaft member transverse to said gears, a plurality of worms on said shaft member for mesh selectively with said gears, means for sliding said shaft member, and means for holding said shaft member in adjusted position, said last named means including manually operable release levers associated with the aforesaid clutches to throw the latter out of play when said holding means for the shaft member are released.

4. A transmission mechanism comprising a pair of axially alined shafts, gears at the inner ends of said shafts, means for connecting said gears and shafts, including clutches for freeing said gears and permitting turning thereof with respect to said shafts, a rotatable and axially shiftable shaft member transverse to said gears, worms on said shaft member for selective mesh with said gears, means for sliding said shaft member, a collar movable bodily with said shaft member, a pair of throw-out levers for the above-named clutches substantially parallel with said shaft member and having means co-operating with said collar to normally hold said shaft member against sliding, and means for operating said levers.

5. A transmission mechanism comprising a pair of axially alined shaft sections, gears at the inner ends of said sections, means for connecting said gears and sections including clutches for freeing said gears, a rotatable and axially slidable shaft member transverse to said gears, worms on said shaft member for selective mesh with said gears, means for sliding said shaft member, a collar movable bodily with said shaft member and having a peripheral flange, a pair of release levers for the aforesaid clutches, said levers being substantially parallel to said shaft member and having notches co-operable with said peripheral flange to hold said shaft member in adjusted position, and means for swinging said levers to simultaneously free said peripheral flange from said notches and throw the aforesaid clutches out of operation.

6. A transmission mechanism comprising a pair of axially alined shaft sections, gears at the inner ends of said sections, means for connecting said gears with said sections including clutches for freeing said gears, a rotatable and axially shiftable shaft member transverse to said gears, a plurality of worms on said shaft member for selective mesh with said gears, means for sliding said shaft member, a collar movable bodily with said member, a pair of clutch throwout levers for the above-named clutches, said levers being substantially parallel with said shaft member and at spaced points having means co-acting with said collar to hold the shaft member in adjusted position, and means for outwardly swinging said levers to free said collar and permit initial movement of the latter and said shaft member, said levers having cams between said spaced points thereof, said cams being co-operable with said collar in holding said levers released while shifting said shaft member from one position to another.

7. In a transmission mechanism having a pair of axially alined gears, and axially shiftable worms selectively engageable with said gears; a differential shell concentric with said gears, clutches for connecting said gears with said shell, means for throwing said clutches out of play while shifting one worm out of mesh with and another worm into mesh with said gears, a pair of shaft sections extending co-axially into said differential shell, and differential gearing in said shell connecting said shaft sections.

8. In a transmission mechanism having a pair of axially alined gears and axially shiftable worms selectively engageable with said gears; a differential shell between said gears having hubs at its ends concentric therewith, clutch casings connected with the outer sides of said gears and having outwardly extending hubs alined with the aforesaid hubs, clutches in said clutch casings for connecting said gears with the hubs of said differential shell, operating collars for said clutches slidable upon said hubs of said clutch casings, a pair of shaft sections extending inwardly through all of said hubs, and differential gearing in said differential shell connecting said shaft sections.

In testimony whereof I have hereunto affixed my signature.

ALBERT ANDREWS.